(12) United States Patent
Nakane

(10) Patent No.: US 7,715,288 B2
(45) Date of Patent: May 11, 2010

(54) OPTICAL DISK APPARATUS AND DATA READ-OUT CONTROL METHOD

(75) Inventor: Hiroshi Nakane, Fukaya (JP)

(73) Assignee: Toshiba Samsung Storage Technology Corporation, Kawasaki (JP)

( * ) Notice: Subject to any disclaimer, the term of this patent is extended or adjusted under 35 U.S.C. 154(b) by 425 days.

(21) Appl. No.: 11/850,372

(22) Filed: Sep. 5, 2007

(65) Prior Publication Data
US 2008/0080329 A1    Apr. 3, 2008

(30) Foreign Application Priority Data
Sep. 28, 2006   (JP) ............................. 2006-265991

(51) Int. Cl.
*G11B 7/00*   (2006.01)
(52) U.S. Cl. .............. 369/44.25; 369/44.35; 369/44.28; 369/53.28
(58) Field of Classification Search ........................ None
See application file for complete search history.

(56) References Cited

U.S. PATENT DOCUMENTS 6,246,646 B1 * 6/2001 Abe et al. ................ 369/44.27
7,548,495 B2 * 6/2009 Kobayashi ............... 369/47.44

FOREIGN PATENT DOCUMENTS

| JP | 11-232656 | 8/1999 |
| JP | 11-296990 | 10/1999 |
| JP | 11-312357 | 11/1999 |
| JP | 2008-21356 | 1/2008 |

* cited by examiner

*Primary Examiner*—Muhammad N. Edun
(74) *Attorney, Agent, or Firm*—Oblon, Spivak, McClelland, Maier & Neustadt, L.L.P.

(57) ABSTRACT

An optical disk apparatus includes an optical pickup head (PUH) which outputs a laser beam through an objective lens. When a control unit receives an instruction to halt data read-out from an optical disk, the control unit moves the PUH to a predetermined position, stores a focus driving voltage corresponding to a position of the objective lens in a memory unit, and halts the output of the laser beam from the PUH. When the control unit receives an instruction to resume the data read-out, the control unit resumes the output of the laser beam from the PUH, starts a focus search on the basis of the focus driving voltage that is stored in the memory unit, moves the objective lens in a direction toward the optical disk, and achieves focus adjustment.

9 Claims, 5 Drawing Sheets

| Rotational position | Focus driving voltage value |
|---|---|
| 0 | (V0) |
| 1 | (V1) |
| ⋮ | ⋮ |
| n | (Vn) |

OPTICAL DISK APPARATUS AND DATA READ-OUT CONTROL METHOD

CROSS-REFERENCE TO RELATED APPLICATIONS

This application is based upon and claims the benefit of priority from prior Japanese Patent Application No. 2006-265991, filed Sep. 28, 2006, the entire contents of which are incorporated herein by reference.

BACKGROUND OF THE INVENTION

1. Field of the Invention

The present invention relates to an optical disk apparatus and a data read-out control method for reading out data, which is recorded on an optical disk, by a laser beam that is radiated from a semiconductor laser.

2. Description of the Related Art

In recent years, game application programs are recorded on optical disks and are sold. With developments of game contents, the resolution of images and the amount of image data in the game application programs have been increasing. Accordingly, the data capacity of the game application program has been increasing. In addition, the data transfer speed for reading out the game application program recorded on the optical disk has been increased.

Examples of supply media of game application programs include a CD (Compact Disk)-ROM, a DVD (Digital Versatile Disk)-ROM (single-layer, double-layer), and an HD-DVD (High Definition DVD)-ROM. The data capacity of the supply media has gradually been increasing.

There is a tendency that users of computer games enjoy the games for a longer time. Thus, the optical disk apparatus is required to have high reliability and a long lifetime, which ensure stable operations for long-time use.

In the meantime, in order to increase the data capacity of the optical disk, the data storage density of the optical disk has been increased. In addition, in order to read/write data from/on the high-storage-density optical disk, the wavelength of a laser beam, which is radiated from a semiconductor laser, has been decreased. In the case where the wavelength of the laser beam is decreased, how to enhance the reliability and lifetime is a challenging problem. On the other hand, the lifetime of the semiconductor laser depends greatly on turn-on time (power-on time). For example, the lifetime of the semiconductor laser can be increased by turning off the semiconductor laser in the idle state in which no data is read/written from/on the optical disk.

Jpn. Pat. Appln. KOKAI Publication No. 11-312357 discloses an optical disk apparatus which includes a pickup unit which reads information recorded on an optical disk by radiating a light beam on the optical disk while executing a focus servo, a tracking servo and a traverse servo; an RF circuit which extracts a focus error signal, a tracking error signal and an RF signal; spindle servo means for controlling a spindle motor for rotating the optical disk; and control means for controlling the respective parts. In this optical disk apparatus, when the working state is switched to the idle state, the loop gain for controlling the spindle motor for rotating the optical disk is switched to the setting of the idle state, thereby reducing the generation of heat and noise.

Jpn. Pat. Appln. KOKAI Publication No. 11-232656 discloses an optical disk apparatus which includes a spindle motor for rotating an optical disk; a head which reproduces a signal that is detected from the optical disk; a reproduction process circuit which processes the signal reproduced by the head; a servo circuit which executes a servo control on the basis of an error signal indicative of an error occurring due to the rotation of the optical disk; and a memory circuit which stores a waveform of the error signal. In this optical disk apparatus, when the servo circuit is restored to the normal servo operation, the servo control is restored to the position indicated by the waveform of the error signal stored in the memory circuit. Thereby, the control is stabilized without repeating the restoration process.

In the case where the lifetime of the semiconductor laser, which is used in the optical disk apparatus, is to be increased, it is thinkable to halt data read from the optical disk and to decrease the turn-on time of the semiconductor laser. However, if the semiconductor laser is turned off and the access to the optical disk is simply halted, a considerable length of time would be needed until the optical disk apparatus is restored once again to the state in which data can be read out from the optical disk apparatus, and the data transfer rate would be decreased.

BRIEF SUMMARY OF THE INVENTION

According to an aspect of the present invention, there is provided an optical disk apparatus which radiates a laser beam on an optical disk and reads out data from the optical disk, comprising: an optical pickup head which outputs the laser beam through an objective lens; a laser control unit which controls the laser beam which is radiated from the optical pickup head; a focus adjustment unit which moves the objective lens in a direction toward the optical disk with a control of a focus driving voltage, thereby adjusting focusing; a memory unit which stores the focus driving voltage; a movement unit which moves the optical pickup head in a radial direction of the optical disk; a rotation unit which rotates the optical disk; and a control unit which moves, when an instruction to halt data read-out from the optical disk is received from an external apparatus, the optical pickup head to a predetermined position, stores the focus driving voltage corresponding to a position of the objective lens in the memory unit, and controls the laser control unit to halt the radiation of the laser beam from the optical pickup head, and which controls, when an instruction to resume the data read-out is received from the external apparatus, the laser control unit to resume the radiation of the laser beam from the optical pickup head, and sets the focus driving voltage of the focus adjustment unit on the basis of the focus driving voltage that is stored in the memory unit, wherein the focus adjustment unit starts a focus search by using the focus driving voltage, moves the objective lens in the direction toward the optical disk, and achieves focus adjustment.

According to another aspect of the present invention, there is provided a data read-out control method comprising: radiating a laser beam on an optical disk through an objective lens of an optical pickup head and reading out data from the optical disk when an instruction to read out data from the optical disk is received; moving, when an instruction to halt the data read-out from the optical disk is received, the optical pickup head to a predetermined position, and storing a focus driving voltage corresponding to a position of the objective lens in a memory unit; halting the radiation of the laser beam from the optical pickup head after the focus driving voltage is stored; resuming, when an instruction to resume the data read-out from the optical disk is received, the radiation of the laser beam from the optical pickup head; setting the focus driving voltage of the focus adjustment unit on the basis of the focus driving voltage that is stored in the memory unit; and starting a focus search by using the focus driving voltage that is set, moving the objective lens in a direction toward the optical disk, and achieving focus adjustment.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will now be described with reference to the accompanying drawings.

Figure 1:
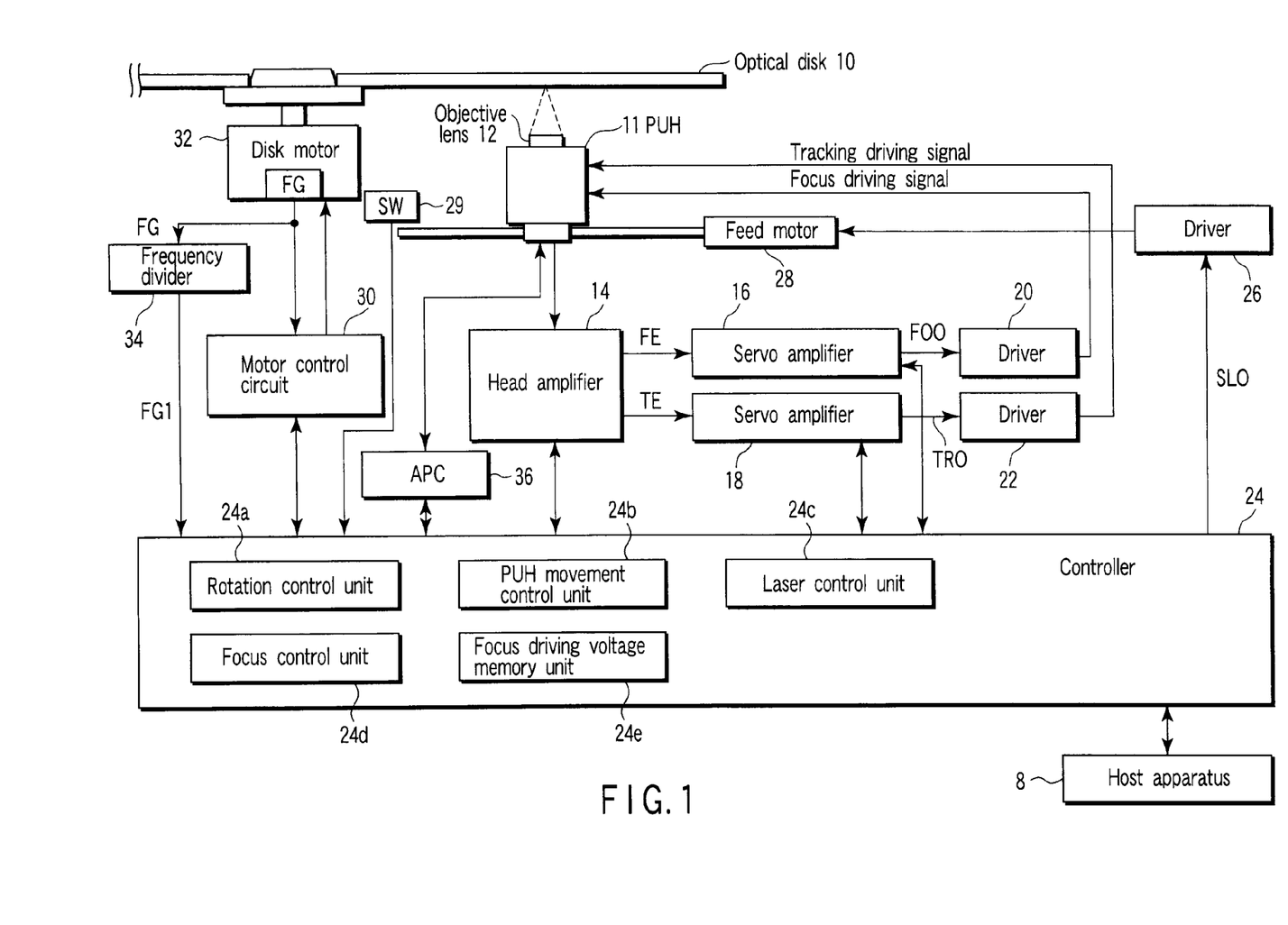
FIG. 1 is a block diagram showing the structure of an optical disk apparatus according to an embodiment of the present invention.

FIG. 1 is a block diagram showing the structure of an optical disk apparatus according to the embodiment.

The optical disk apparatus according to the embodiment is accessed by a host apparatus 8. The host apparatus 8 reads out, for example, a game application program, which is recorded on an optical disk 10, and executes the game application program. The host apparatus 8 executes an application program for accessing the optical disk 10, and outputs commands to the optical disk apparatus, as needed. The commands, which are output from the host apparatus 8 to the optical disk apparatus, include a data read command for instructing read-out of data recorded on the optical disk 10, and an idle command for instructing halt of data read-out.

Spiral tracks are formed on the optical disk 10. The optical disk 10 is rotated by a disk motor 32. In the optical disk apparatus according to the embodiment, it is assumed that optical disks, such as a CD (Compact Disk), a DVD (Digital Versatile Disk) and an HD-DVD (High Definition DVD), are usable as the optical disk 10. CD-series disks include, for instance, a CD-ROM, a CD-R and a CD-RW. DVD-series disks include, for instance, a DVD-ROM, a DVD-RAM, a DVD-R, a DVD-RW, a DVD+R and a DVD+RW.

Recording/reproduction of data on/from the optical disk 10 is effected by a laser beam which is emitted from an optical pickup head (PUH) 11. The optical pickup head 11 is supported such that the optical pickup head 11 is movable in a radial direction of the optical disk 10 by a feed screw that is attached to a rotational shaft of a feed motor 28. The optical pickup head 11 is moved by the rotation of the feed motor 28 while the optical pickup head 11 is facing the data read surface of the optical disk 10.

The optical pickup head 11 includes a laser diode (semiconductor laser), a collimator lens, a beam splitter, an objective lens 12, a cylindrical lens, a photodetector, a lens position sensor and a monitor diode.

In addition, the optical pickup head 11 is provided with a biaxial actuator which moves the objective lens 12 in two mutually perpendicular directions. Specifically, the optical pickup head 11 is provided with a focusing actuator which adjusts focusing by moving the objective lens 12 in a focusing direction (i.e. an optical axis direction of the lens), and a tracking actuator which adjusts tracking by moving the objective lens 12 in a tracking direction (i.e. radial direction). The focusing actuator is controlled by a focus driving signal (focus driving voltage) which is output from a driver 20. The tracking actuator is controlled by a tracking driving signal from a driver 22.

The laser diode is driven by an auto power control (APC) circuit 36 which is controlled by a laser control unit 24c of a controller 24, and the laser diode emits a laser beam. The laser beam output from the laser diode is radiated on the optical disk 10 via the collimator lens, beam splitter and objective lens 12.

In the optical disk apparatus according to the embodiment, a plurality of laser diodes, which emit laser beams of different wavelengths, are provided. Specifically, an infra-red laser for CD (wavelength: 780 nm), a red laser for DVD (wavelength: 650 nm) and a blue laser for HD-DVD (wavelength: 405 nm) are provided. The APC 36, under the control of the controller 24, enables one of these laser diodes to emit a laser beam for a corresponding disk.

The objective lens 12 has numerical apertures (NA) corresponding to the respective lasers. The spot size of the laser beam that emerges from the objective lens 12 and falls on an information recording layer of the optical disk 10 is, for example, about 1.35 µm in the case of the laser beam for CD, about 0.94 µm in the case of the laser beam for DVD, and about 0.55 µm in the case of the laser beam for HD-DVD. In the case where a tracking error signal, which is generated by a DPP (Differential Push-Pull) method, is used at the time of, e.g. data recording, the laser beam is radiated such that the laser beam is divided into three beams by, e.g. a diffraction grating which is provided on the optical path, and the beam spots of the three beams are formed on the optical disk 10.

Reflective light from the optical disk 10 is guided to the photodetector via the objective lens 12, beam splitter and cylindrical lens. The photodetector comprises, e.g. four divided photodetectors. Signals that are detected by the four photodetectors (photodetectors 11a, 11b, 11c and 11d) are amplified to predetermined values by current-voltage conversion (I-V conversion) and are output to a head amplifier 14.

The APC circuit 36 drives the laser diode under the control of the laser control unit 24c of the controller 24. The APC circuit 36 controls the ON/OFF of the laser output and the intensity of the laser beam at the time of reproduction or recording. The APC circuit 36 controls a driving current to the laser diode so that the output of a monitor diode (not shown), which is mounted in the optical pickup head 11, may have a predetermined value.

The head amplifier 14 processes a signal from the photodetector and outputs the processed signals. For example, the head amplifier 14 generates and outputs a tracking error signal (TE) which indicates an error between a beam spot center of the laser beam and a track center, a focus error signal (FE) which indicates an error from a just-focus position, and an all-addition signal (RF signal) in which the signals from the photodetectors are added (to be described later in greater detail).

The focus error signal FE from the head amplifier 14 is output to a servo amplifier 16, and the tracking error signal TE (DPD signal, PP signal) is output to a servo amplifier 18.

The servo amplifier 16 controls the driver 20 in accordance with the focus error signal FE that is output from the head amplifier 14. A focus driving signal, which is output from the driver 20, causes the focusing actuator to drive the optical pickup head 11 so as to set the laser beam emitted from the optical pickup head 11 just in focus. The laser beam from the optical pickup head 11 is radiated on the recording film of the optical disk 10.

The servo amplifier 18 controls the driver 22 in accordance with the tracking error signal TE which is output from the head amplifier 14. A tracking driving signal, which is output from the driver 22, causes the tracking actuator to drive the optical pickup head 11, thereby executing a tracking servo so as to make the laser beam emitted from the optical pickup head 11 constantly trace the track on the optical disk 10.

The disk motor 32 is a spindle motor, for instance. The disk motor 32 is provided with a frequency generator (FG) which generates a signal in accordance with a rotational angle. The frequency generator (FG) generates FG signals corresponding to a rotational angle, for example, 18 FG signals for a single revolution, making use of, e.g. an electromotive force of a magnetic field coil of a stator or an output of a Hall element which detects the rotational angle of the magnet of a rotor.

A frequency divider 34 divides the FG signal that is output from the disk motor 32, and generates an FG1 signal which indicates, for example, one rotation of the disk motor 32. The frequency divider 34 outputs the FG1 signal to the controller 24. The controller 24 compares the FG1 signal with an internal reference frequency, controls a motor control circuit 30 in accordance with an error of the comparison result, and rotates the disk motor 32 at a predetermined number of revolutions. The frequency divider 34 generates not only the FG1 signal but also a timing signal indicative of a plurality of rotational positions of the disk motor 32, and outputs the timing signal to the controller 24.

The controller 24 is configured to include processors and memories (RAM area, ROM area). The controller 24 causes the processors to execute various programs stored in the memories, thereby executing an overall control of the apparatus. The controller 24 includes a rotation control unit 24a, a PUH movement control unit 24b, a laser control unit 24c, a focus control unit 24d and a focus driving voltage memory unit 24e. These circuits are realized by hardware and/or software.

The rotation control unit 24a controls the rotation of the disk motor 32 via the motor control circuit 30.

The PUH movement control unit 24b drives the feed motor 28 via a driver 26, thereby executing a control to move the optical pickup head 11 in the radial direction of the optical disk 10. The feed motor 28 is a stepping motor, for instance. If the optical pickup head 11 is moved by the feed motor 28 in the radially inward direction of the optical disk 10, a switch (SW) 29 detects that the optical pickup head 11 reaches a predetermined initial position. The PUH movement control unit 24b executes a control to move the optical pickup head 11 from the initial position, which is detected by the switch 29, to a predetermined access position.

For example, it is assumed that the switch 29 is set to detect a position corresponding to a radius of 25 mm of the optical disk 10. Also assume that the feed screw that is attached to the feed motor 28 has such a speed-change ratio that the optical pickup head 11 is moved by 3 mm each time the feed motor 28 (stepping motor) is rotated by a single revolution. In this case, the PUH movement control unit 24b of the controller 24 outputs, after the switch 29 detects the optical disk 10, a driving signal SLO for rotating the feed motor 28 by a single revolution to the driver 26, thus being able to move the optical pickup head 11 by 3 mm. For example, after the optical pickup head 11 is detected by the switch 29, the feed motor 28 is rotated by one revolution so as to move the optical pickup head 11 in a radially outward direction of the optical disk 10. Thereby, the optical pickup head 11 is moved to a position corresponding to 28 mm in the radial direction of the optical disk 10.

The laser control unit 24c controls the APC circuit 36 and causes the laser diode of the optical pickup head 11 to emit a laser beam. The optical pickup head 11 is equipped with laser diodes for emitting an infrared laser beam for CD (hereinafter referred to as "CD laser beam"), a red laser beam for DVD ("DVD laser beam") and a blue laser beam for HD-DVD ("HD laser beam"). The laser control unit 24c selects a laser diode corresponding to the kind of the optical disk 10, and causes the selected laser diode to radiate a laser beam on the optical disk 10.

The focus control unit 24d executes, via the servo amplifier 16, a control for focusing the laser beam, which is radiated from the optical pickup head 11, on the optical disk 10. The focus control unit 24d also executes a focus control for resuming the focusing after data read-out from the optical disk 10 is halted.

The focus driving voltage memory unit 24e stores, under the control of the controller 24, a focus driving voltage which is used for the focus control by the focus control unit 24d. Specifically, when an instruction to halt data read-out from the optical disk 10 is issued from the host apparatus 8, the controller 24 stores the focus driving voltage, which corresponds to the position of the objective lens 12 immediately before the halt of the output of the laser beam, into the focus driving voltage memory unit 24e. In addition, the focus driving voltage memory unit 24e stores focus driving voltage values corresponding to a plurality of rotational positions, in accordance with signals indicative of the plurality of rotational positions of the disk motor 32, which are input from the frequency divider 34. Specifically, the controller 24 stores focus driving voltage values, which vary due to surface wobbling of the optical disk 10 that is rotated by the disk motor 32, into the focus driving voltage memory unit 24e with respect to a single revolution of the disk motor 32.

Figure 2:
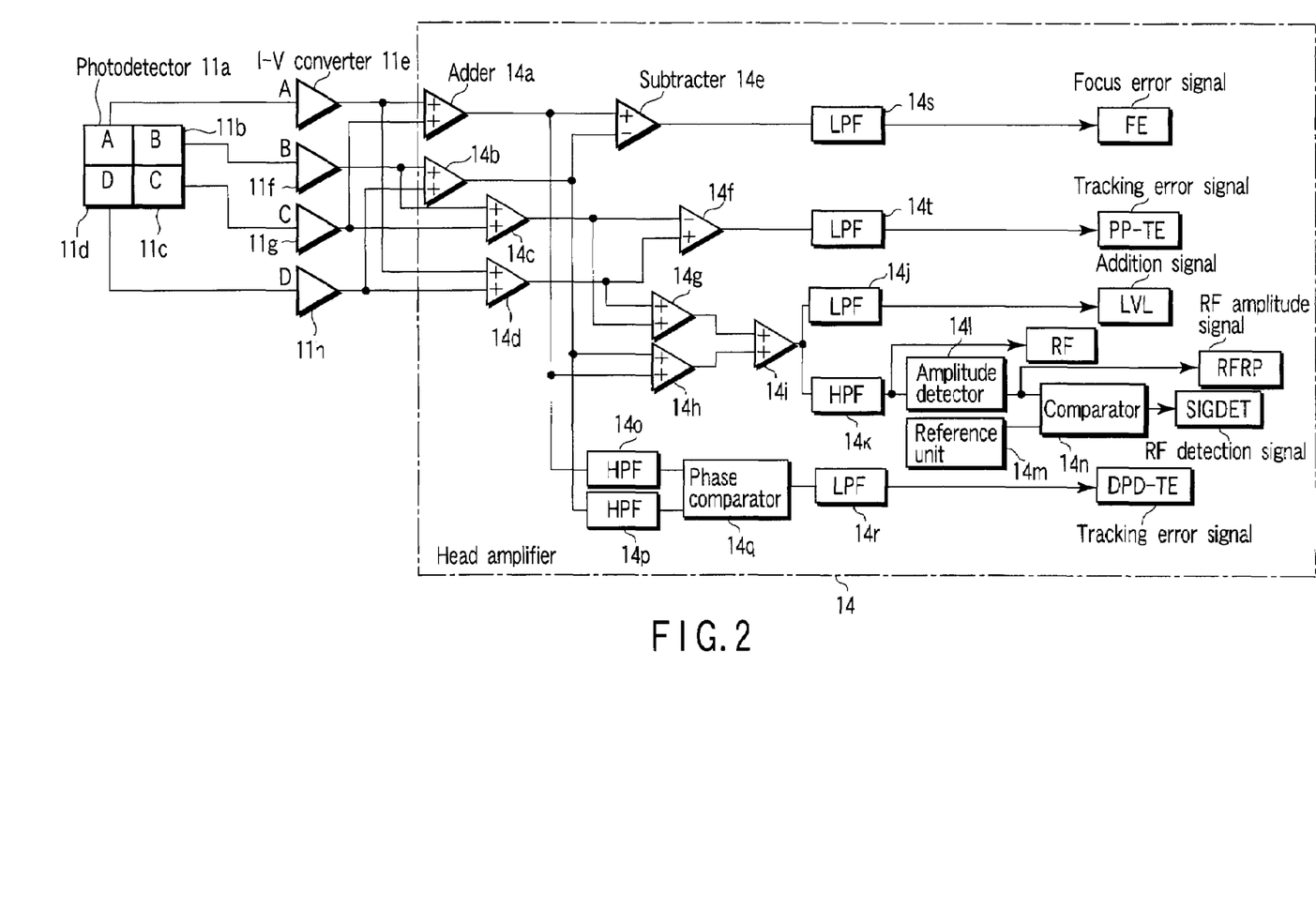
FIG. 2 shows detailed structures of a photodetector of an optical pickup head 11 and a head amplifier 14 in the embodiment.

FIG. 2 shows detailed structures of the photodetectors (11a, 11b, 11c, 11d) of the optical pickup head 11 and the head amplifier 14.

Signals A, B, C and D, which are detected by the four divisional photodetectors 11a, 11b, 11c and 11d, are current-to-voltage converted to a predetermined voltage value by I-V converters 11e, 11f, 11g and 11h which are provided in the optical pickup head 11.

The signal A that is output from the I-V converter 11e is input to adders 14a and 14d in the head amplifier 14. The signal B that is output from the I-V converter 11f is input to adders 14b and 14c in the head amplifier 14. The signal C that is output from the I-V converter 11g is input to adders 14a and 14c in the head amplifier 14. The signal D that is output from the I-V converter 11h is input to adders 14b and 14d in the head amplifier 14. Accordingly, the adder 14a outputs a signal (A+C) in which the signal A and signal C are added. Similarly, the adder 14b outputs a signal (B+D), the adder 14c outputs a signal (B+C), and the adder 14d outputs a signal (A+D).

The signal (A+C), which is output from the adder 14a, is input to a subtracter 14e, an adder 14h and a high-pass filter (HPF) 14o. The signal (B+D), which is output from the adder 14b, is input to the subtracter 14e, an adder 14h and a high-pass filter (HPF) 14p. The signal (B+C), which is output from the adder 14c, is input to a subtracter 14f and an adder 14g. The signal (A+D), which is output from the adder 14d, is input to the subtracter 14f and the adder 14g.

The subtracter 14e subtracts the signal (B+D), which is output from the adder 14b, from the signal (A+C) which is output from the adder 14a, and outputs a resultant subtraction signal. The signal from the subtracter 14e is passed through a low-pass filter (LPF) 14s and is output as a focus error signal (FE). That is, the focus error signal FE=(A+C)−(B+D) is produced.

The subtracter 14f subtracts the signal (B+C), which is output from the adder 14c, from the signal (A+D) which is output from the adder 14d, and outputs a resultant subtraction signal. The signal from the subtracter 14f is passed through a low-pass filter (LPF) 14t and is output as a tracking error signal (PP-TE) according to a push-pull method. That is, the tracking error signal (PP-TE)=(A+D)−(B+C) according to a push-pull method is produced.

A phase comparator 14q receives the signal (A+C), which is output from the adder 14a via the HPF 14o, and the signal (B+D) which is output from the adder 14b via the HPF 14p, and outputs a signal representative of a phase difference between the two signals (A+C) and (B+D), that is, a signal that is obtained by subtracting the signal (B+D) from the signal (A+C). The signal that is output from the phase comparator 14q is passed through a low-pass filter (LPF) 14r and is output as a tracking error signal TE (Differential Phase Detection (DPD)−TE) according to a differential phase detection method. That is, the tracking error signal (DPD−TE)=φ(A+C)−φ(B+D) according to a differential phase detection method is produced.

The adder 14g adds the signal (A+D) from the adder 14d and the signal (B+C) from the adder 14c and outputs an addition signal. The adder 14h adds the signal (A+C) from the adder 14a and the signal (B+D) from the adder 14b and outputs an addition signal. An adder 14i adds the signals from the adder 14g and adder 14h and outputs an addition signal. In short, the adder 14i outputs a signal (A+B+C+D) in which the signals from all photodetectors 11a, 11b, 11c and 11d are added. The signal from the adder 14i is passed through an LPF 14j and is output as an addition signal LVL (hereinafter referred to as "LVL signal"). In addition, the signal that is output from the adder 14i is passed through an HPF 14k and is output as an information signal RF (hereinafter referred to as "RF signal"). The signal that is output through the HPF 14k is also input to an amplitude detector 14l. The amplitude detector 14l detects an amplitude value of the RF signal and outputs an RF amplitude signal RFRP that varies in proportion to this amplitude value.

The RF amplitude signal that is output from the amplitude detector 14l is input to a comparator 14n. The comparator 14n compares the level of the RF amplitude signal with a reference value which is preset in a reference unit 14m. If the level of the RF amplitude signal is higher than the reference value, the comparator 14n outputs an RF detection signal SIGDET (hereinafter referred to as "SIGDET signal"). The SIGDET signal indicates that the RF signal, which represents information recorded on the optical disk 10, has been detected.

Next, the operation of the optical disk apparatus according to the present embodiment is described.

To begin with, the basic operation of the focusing is described.

Figure 3:
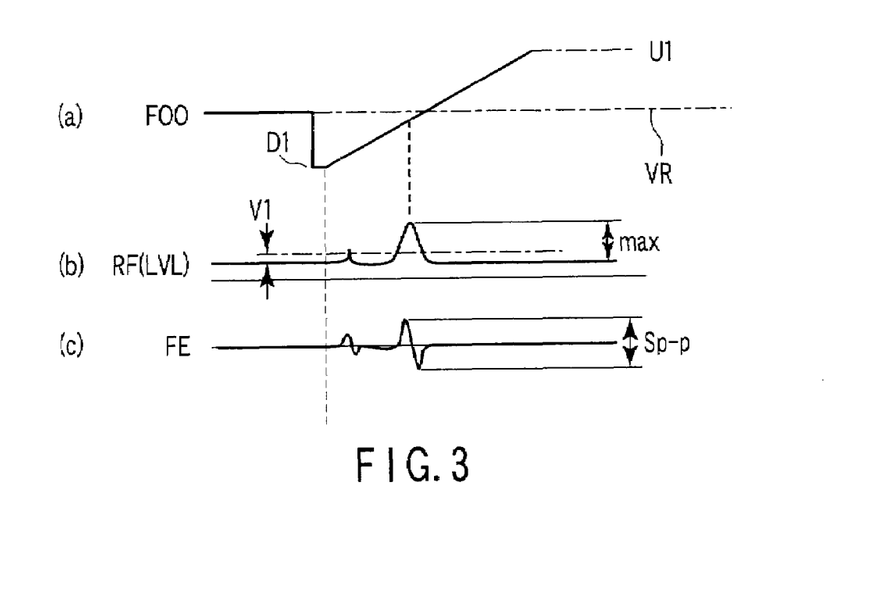
FIG. 3 shows variations in signals for a focus control.

FIG. 3 shows variations in signals for the focus control. Specifically, FIG. 3 shows a variation in a focus driving signal FOO which is output to the focusing actuator of the optical pickup head 11, a variation in an RF (LVL) signal which varies as the objective lens 12 moves in accordance with the focus driving signal FOO, and a variation in a focus error signal FE.

To start with, the focus control unit 24d of the controller 24 operates the servo amplifier 16, thereby setting the voltage level of the focus driving signal FOO, which is output to the optical pickup head 11, at D1. Specifically, the focus control unit 24d drives the focusing actuator of the optical pickup head 11 and moves the objective lens 12 in a direction away from the optical disk 10. When the objective lens 12 is set in a focus-on position, the objective lens 12 is moved in a direction toward to the optical disk 10 from the position that is distant from the optical disk 10, and the focal point is detected. This operation is performed in order to prevent the objective lens 12 from contacting the optical disk 10 even if surface wobbling of the optical disk 10 occurs while the optical disk 10 is rotating.

Subsequently, as shown in FIG. 3, the focus control unit 24d causes the driver 20 to output the focus driving signal FOO to the focusing actuator, thereby to move the objective lens 12 in the optical axis direction at a fixed speed. The focusing actuator moves the objective lens 12 toward the optical disk 10 in accordance with the focus driving signal FOO, the voltage value of which varies with a predetermined gradient. The focus control unit 24d causes the driver 20 to output the focus driving signal FOO to the focusing actuator while increasing the voltage value of the focus driving signal FOO up to a preset voltage limit value U1 at a constant rate.

During this time, the head amplifier 14 outputs various signals, such as the RF(LVL) signal and focus error signal FE, in accordance with reflective light which is received by the optical pickup head 11 from the optical disk 10. A first peak of the RF(LVL) signal shown in FIG. 3 represents a variation corresponding to the laser beam reflected by the surface of the optical disk 10, and a second peak (max) of the voltage value represents a variation corresponding to the laser beam reflected by the data recording layer of the optical disk 10. As shown in FIG. 3, an S-shaped curve appears in the focus error signal FE at a position corresponding to the maximum (max) of the voltage value of the RF (LVL) signal. In short, a focal point, at which a focus error is "0", is detected.

Even in the case where the focus driving signal FOO reaches the voltage limit value U1, if the RF(LVL) signal does not reach the reference value V1 or more, the controller 24 determines that the optical disk 10 is not loaded in the optical disk apparatus. Even in the case where the optical disk 10 is loaded in the optical disk apparatus, if the surface (on which the laser beam is radiated) of the optical disk 10 is stained or if the optical disk 10 is loaded upside down, the RF(LVL) signal is not normally detected and the absence of the optical disk 10 is determined.

Next, a description is given of the operation in the case where the data read-out from the optical disk 10 is halted in the present embodiment.

It is assumed that the host apparatus 8 reads out the game application program from the optical disk 10 that is loaded in the optical disk apparatus, and executes the game application program. When the game is started, the host apparatus 8 reads out a great amount of data from the optical disk 10 and stores the data in the internal memory. The host apparatus 8 executes the game application that is loaded in the internal memory. In addition, the host apparatus 8 executes a data read-out request to the optical disk apparatus in accordance with the progress of the game.

In the optical disk apparatus in the present embodiment, the turn-on of the laser diode (semiconductor laser) of the optical pickup head 11 is stopped from a time when the data read-out request for data read-out from the optical disk 10 is halted to a time when the data read-out request is resumed. Thereby, the turn-on time of the semiconductor laser is shortened, and the lifetime of the semiconductor laser is increased. The optical disk apparatus, however, always stands by so as to be able to restore to the state in which the data read-out is enabled, since it is impossible to estimate when the data read-out request is resumed.

Figure 4:
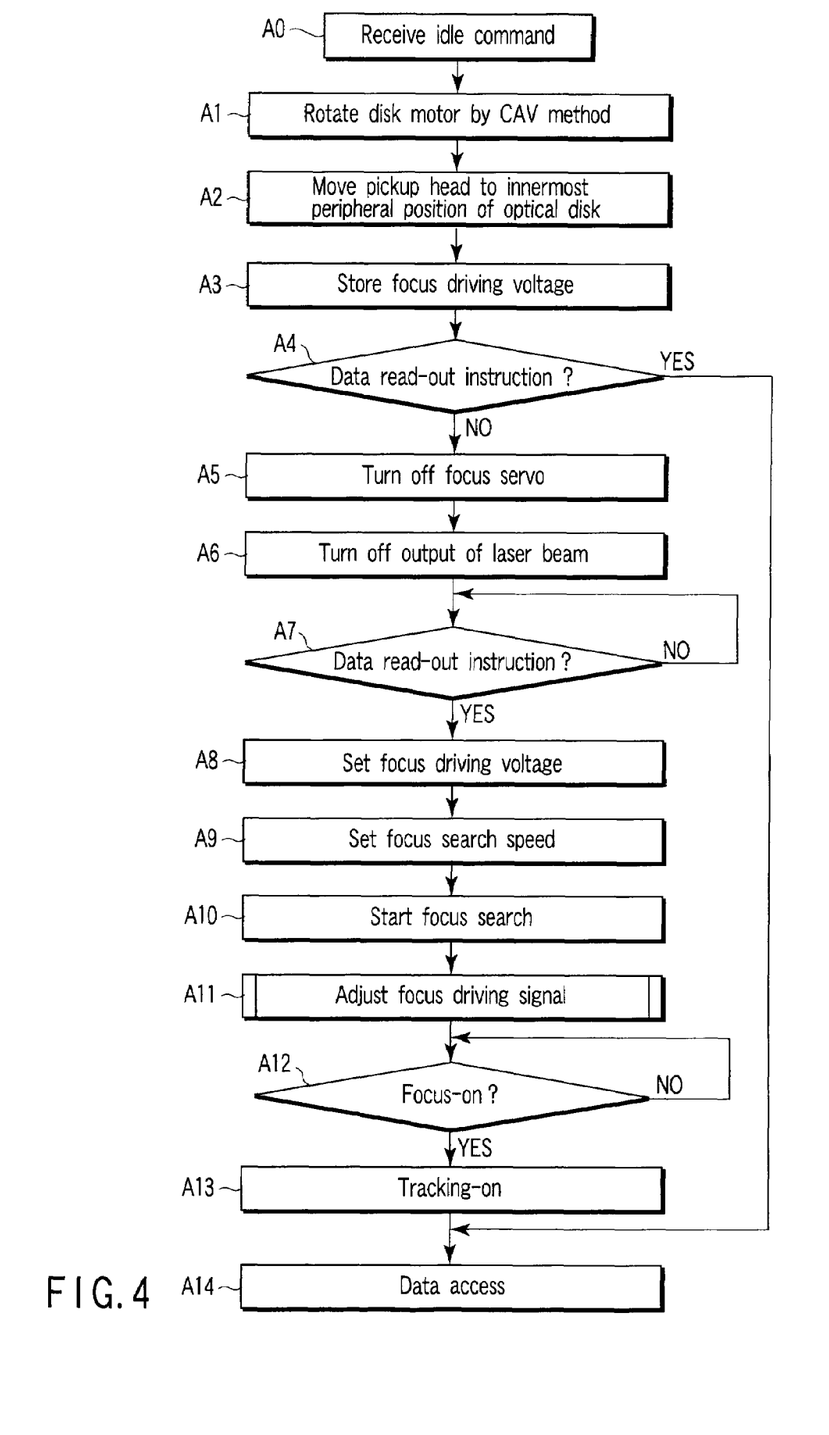
FIG. 4 is a flowchart for explaining a process from a time when a data read-out halt instruction is input from a host apparatus to a time when data access is resumed in the embodiment.

FIG. 4 is a flowchart for describing the process from when the instruction to halt the data read-out is input from the host apparatus 8 to when the data access is resumed.

To start with, the host apparatus 8 outputs an idle command to the optical disk apparatus in the case of halting the read-out of data, which is recorded on the optical disk 10, while the game application program is being executed.

If the controller 24 receives the idle command from the host apparatus 8, the controller 24 halts the data read-out from the optical disk 10 (step A0).

The rotation control unit 24a, which has received the idle command, rotates the disk motor 32 by a constant angular velocity (CAV) method in which the disk motor 32 is rotated at a predetermined number of revolutions (step A1). Specifically, the optical disk 10 is rotated at a higher speed than in a constant linear velocity (CLV) method so that data access can be executed at high speed when the data access is resumed.

Subsequently, prior to turning off the focus servo, the PUH movement control unit 24b moves in advance the optical pickup head 11 in the radially inward direction of the optical disk 10, for example, to an innermost peripheral position on the optical disk 26 (step A2). Specifically, the PUH movement control unit 24b causes the driver 26 to drive the feed motor 28, thereby moving the optical pickup head 11 to the initial position corresponding to the innermost peripheral position on the optical disk 10. Since the innermost peripheral position of the optical disk 10 is closest to the position at which the optical disk 10 is mounted on the disk motor 32, the amount of surface wobbling of the optical disk 10 is smallest at this innermost peripheral position. Accordingly, focus-on is more easily achieved on the inner peripheral position than on the outer peripheral side.

When the optical pickup head 11 is moved to the innermost peripheral position, the controller 24 stores the focus driving voltage of the objective lens 12 in the focus driving voltage memory unit 24e (step A3). The focus driving voltage memory unit 24e stores the focus driving voltage that varies in accordance with the surface wobbling of the optical disk 10 which occurs while the optical disk 10 is being rotated by the disk motor 32.

Figure 5:
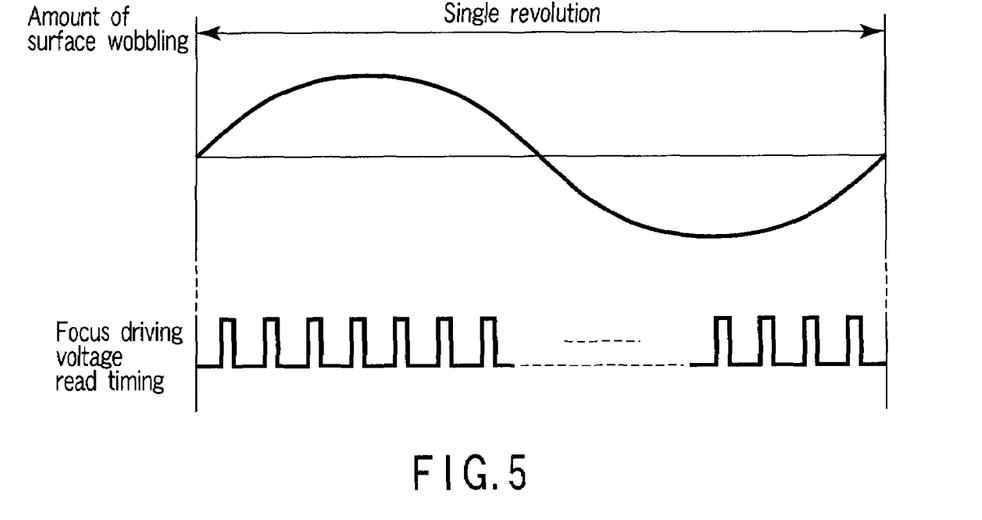
FIG. 5 is a graph showing a variation in the amount of surface wobbling of an optical disk 10 and a read timing of a focus driving voltage value in the embodiment.

FIG. 5 is a graph showing a variation in surface wobbling of the optical disk 10 and the read timing of the focus driving voltage value. As shown in FIG. 5, surface wobbling of the optical disk 10 occurs while the optical disk 10 is rotating. The controller 24 stores the focus voltage value, which is obtained while the optical disk 10 is rotated by a single revolution, in the focus driving voltage memory unit 24e in accordance with the timing signal that is input from, e.g. the frequency divider 34. The timing signal that is input from the frequency divider 34 is a signal indicative of a plurality of rotational positions of the disk motor 32. The controller 24 stores the focus driving voltage value in the focus driving voltage memory unit 24e in accordance with the timing signal that is generated while the disk motor 32 is rotated by a single revolution.

Figure 6:
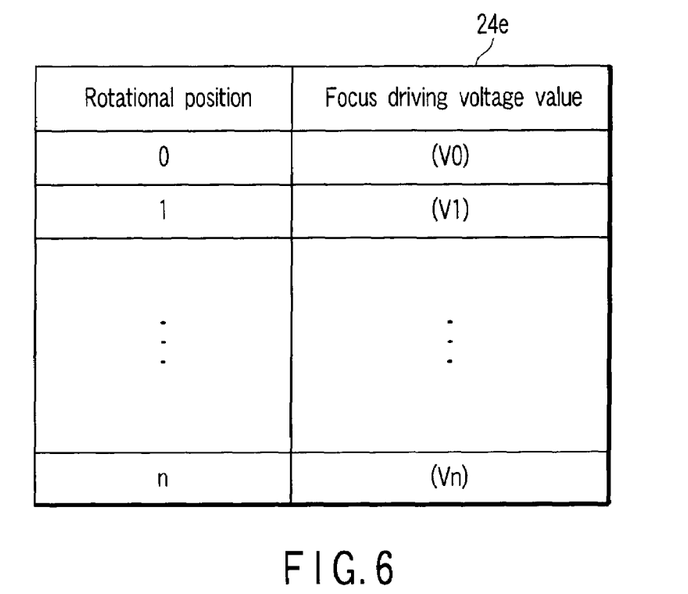
FIG. 6 shows focus driving voltage values which are stored in a focus driving voltage memory unit 24e in the embodiment.

FIG. 6 shows focus driving voltage values which are stored in the focus driving voltage memory unit 24e. As shown in FIG. 6, the focus driving voltage values at respective rotational positions are stored in association with the data indicative of the rotational positions of the disk motor 32.

If the data read-out command is input from the host apparatus 8 (Yes in step A4), the controller 24 causes the servo amplifier 16 to turn off the focus servo (step A5). In addition, the controller 24 causes the laser control unit 24c to turn off the operation of the semiconductor laser (i.e. the output of the laser beam) of the optical pickup head 11 via the APC circuit 36 (step A6).

As described above, the turn-on of the semiconductor laser is halted in the idle state in which no data access is executed to the optical disk 10, and thus the lifetime of the semiconductor laser is increased. In the idle state, the rotation control unit 24a causes the motor control circuit 30 to keep rotating the disk motor 32 at high speed by the CAV method.

Subsequently, if the controller 24 receives the data read-out command from the host apparatus 8 in the idle state, the controller 24 resumes the data read-out from the optical disk 10 (Yes in step A7). Then, the laser control unit 24c resumes the turn-on of the semiconductor laser of the optical pickup head 11.

Thereafter, the focus control unit 24d sets the focus driving voltage which is a voltage for starting a focus search (step A8). Specifically, immediately prior to transition to the idle state, the focus control unit 24d sets the focus search start voltage on the basis of the focus driving voltage values stored in the focus driving voltage memory unit 24e. It is assumed that use is made of a focus driving voltage value at a time of maximum surface wobbling, from among the focus driving voltage values (see FIG. 5 and FIG. 6) for the single revolution of the disk motor 32, which are stored in the focus driving voltage memory unit 24e.

For example, the focus control unit 24d may directly use the focus driving voltage, which is stored in the focus driving voltage memory unit 24e, as the focus search start voltage. At the time of starting the focus search, in order to surely prevent the objective lens 12 from contacting the optical disk 10 due to surface wobbling of the optical disk 10, it may be possible to set the focus search start voltage by adding a predetermined small voltage value to the focus driving voltage value that is stored in the focus driving voltage memory unit 24e.

By setting the focus search start voltage on the basis of the focus driving voltage value immediately prior to transition to the idle state, it becomes possible to start the focus search from a focus driving voltage value which is closer to the focus driving voltage value at the time of focus-on than the voltage level D1 of the focus driving signal FOO in the case of executing an ordinary focus search. Therefore, the time from the start of the focus search to the focus-on can be decreased.

In a subsequently step, the focus control unit 24d sets the focus search speed (step A9). In this case, the focus search speed is set so that the movement speed of the object lens 12 may become lower than in the case of moving the objective lens 12 by an ordinary focus search. Specifically, the variation of the focus driving signal FOO, which is shown in FIG. 3, is made gentler. By decreasing the focus search speed, the distance of over-run of the objective lens 12 from the focus-on position is decreased, and the focus-on can be achieved more easily.

If the focus search start voltage and focus search speed are set as described above, the focus control unit 24d starts the focus search (step A10).

In addition, when the focus control unit 24d moves the objective lens 12 toward the optical disk 10 in accordance with the focus search speed, the focus control unit 24d adjusts the focus driving signal FOO (step A11). Specifically, the focus control unit 24d suppresses the variation in relative speed of the objective lens 12 due to surface wobbling of the optical disk 10, thereby to achieve focus-on in a short time.

As shown in FIG. 5, the degree of surface wobbling of the optical disk 10 varies while the disk motor 32 rotates by a single revolution. Thus, even if the objective lens 12 is constantly moved, the variation in distance between the optical disk 10 and objective lens 12 does not become constant. For example, if the amount of surface wobbling of the optical disk 10 increases in a direction toward the objective lens 12, the relative speed of the objective lens 12 increases. In this case, a disadvantage occurs in achieving the focus-on.

The focus control unit 24d executes adjustment of the focus driving signal on the basis of the focus driving voltage value that is stored in the focus driving voltage memory unit 24e immediately prior to transition to the idle state.

Figure 7:
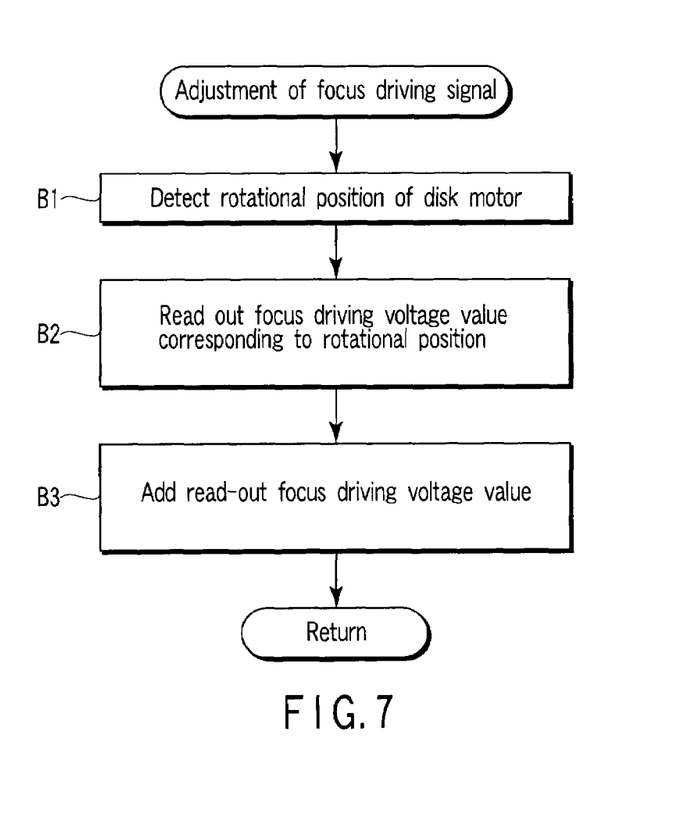
FIG. 7 is a flowchart for describing the adjustment of a focus driving signal in the embodiment.

FIG. 7 is a flowchart for describing the adjustment of the focus driving signal.

The focus control unit 24d detects the rotational position of the disk motor 32 on the basis of the data that is input from the frequency divider 34 (step B1). The focus control unit 24d reads out the focus driving voltage value, which corresponds to the current rotational position of the disk motor 32, from the focus driving voltage values corresponding to the respective rotational positions stored in the focus driving voltage memory unit 24e (step B2).

The focus control unit 24d adds the read-out focus driving voltage value to the focus driving signal so as to make constant the relative speed of the objective lens 12, and causes the servo amplifier 16 to output the resultant signal (step B3).

For example, in the case where the focus driving voltage value is such a value as to increase the amount of surface wobbling of the optical disk 10 in a direction toward the objective lens 12, the focus control unit 24d adjusts the focus driving signal FOO so as to decrease the focus driving signal FOO by an amount corresponding to the focus driving voltage value. On the other hand, in the case where the focus driving voltage value is such a value as to decrease the amount of surface wobbling of the optical disk 10 in a direction toward the objective lens 12, the focus control unit 24d adjusts the focus driving signal FOO so as to increase the focus driving signal FOO by an amount corresponding to the focus driving voltage value.

Thereby, even if surface wobbling of the optical disk 10 occurs, the relative speed of the objective lens 12, in relation to the optical disk 10, can be made constant. Therefore, focus-on can be achieved without adverse effect due to the surface wobbling of the optical disk 10.

The focus control unit 24d detects the focus-on on the basis of the focus error signal FE that is detected by the head amplifier 14 (Yes in step A12). After the focus-on, the controller 24 achieves tracking-on and transitions to the data read-out operation that is requested from the host apparatus 8 (step A13, A14). The rotation control unit 24a rotates the disk motor 32 by the CLV method.

As has been described above, in the optical disk apparatus of the present embodiment, in the idle state in which data read-out is halted, the turn-on of the semiconductor laser of the optical pickup head 11 is stopped. Therefore, the turn-on time of the semiconductor laser is decreased, and the lifetime is increased. Furthermore, prior to transition to the idle state, the turn-on of the semiconductor laser is halted in the state in which the data access is made quickly resumable. Therefore, when the resumption of the data read-out is instructed from the host apparatus 8, focus-on is achieved in a short time and the data access can be resumed. Hence, even if the turn-on of the semiconductor laser is temporarily halted, the data transfer rate does not decrease.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk apparatus which radiates a laser beam on an optical disk and reads out data from the optical disk, comprising:
    an optical pickup head which outputs the laser beam through an objective lens;
    a laser control unit which controls the laser beam which is radiated from the optical pickup head;
    a focus adjustment unit which moves the objective lens in a direction toward the optical disk with a control of a focus driving voltage, thereby adjusting focusing;
    a memory unit which stores the focus driving voltage;
    a movement unit which moves the optical pickup head in a radial direction of the optical disk;
    a rotation unit which rotates the optical disk; and
    a control unit which moves, when an instruction to halt data read-out from the optical disk is received from an external apparatus, the optical pickup head to a predetermined position, stores the focus driving voltage corresponding to a position of the objective lens in the memory unit, and controls the laser control unit to halt the radiation of the laser beam from the optical pickup head, and which controls, when an instruction to resume the data read-out is received from the external apparatus, the laser control unit to resume the radiation of the laser beam from the optical pickup head, and sets the focus driving voltage of the focus adjustment unit on the basis of the focus driving voltage that is stored in the memory unit,
    wherein the focus adjustment unit starts a focus search by using the focus driving voltage, moves the objective lens in the direction toward the optical disk, and achieves focus adjustment.

2. The optical disk apparatus according to claim 1, wherein when the control unit receives the instruction to halt the data read-out, the control unit controls the rotation unit to rotate the optical disk at a high speed by a constant angular velocity (CAV) method.

3. The optical disk apparatus according to claim 1, wherein when the control unit receives the instruction to halt the data read-out, the control unit controls the movement unit to move the optical pickup head to an innermost peripheral position of the optical disk, and stores the focus driving voltage, which corresponds to the innermost peripheral position, in the memory unit.

4. The optical disk apparatus according to claim 1, wherein when the focus adjustment unit moves the objective lens with the focus driving voltage stored in the memory unit, the focus adjustment unit controls the focus driving voltage such that a movement speed of the objective lens becomes lower than a normal movement speed.

5. The optical disk apparatus according to claim 1, wherein the memory unit stores focus driving voltage values which correspond to a plurality of rotational positions of the optical disk that is rotated by the rotation unit and which vary in accordance with surface wobbling of the optical disk, and
the focus adjustment unit corrects the focus driving voltage for moving the objective lens, on the basis of the focus driving voltage value corresponding to each of the rotational positions stored in the memory unit.

6. A data read-out control method comprising:
radiating a laser beam on an optical disk through an objective lens of an optical pickup head and reading out data from the optical disk when an instruction to read out data from the optical disk is received;
moving, when an instruction to halt the data read-out from the optical disk is received, the optical pickup head to a predetermined position, and storing a focus driving voltage corresponding to a position of the objective lens in a memory unit;
halting the radiation of the laser beam from the optical pickup head after the focus driving voltage is stored;
resuming, when an instruction to resume the data read-out from the optical disk is received, the radiation of the laser beam from the optical pickup head;
setting the focus driving voltage of the focus adjustment unit on the basis of the focus driving voltage that is stored in the memory unit; and
starting a focus search by using the focus driving voltage that is set, moving the objective lens in a direction toward the optical disk, and achieving focus adjustment.

7. The data read-out control method according to claim 6, wherein when the instruction to halt the data read-out is received, the optical disk is rotated at a high speed by a constant angular velocity (CAV) method.

8. The data read-out control method according to claim 6, wherein when the instruction to halt the data read-out is received, the optical pickup head is moved to an innermost peripheral position of the optical disk, and the focus driving voltage, which corresponds to the innermost peripheral position, is stored in the memory unit.

9. The data read-out control method according to claim 6, wherein when the objective lens is moved with the focus driving voltage stored in the memory unit, a movement speed of the objective lens is set to be lower than a normal movement speed.

* * * * *